United States Patent

Coetzer et al.

[11] Patent Number: 5,972,533
[45] Date of Patent: Oct. 26, 1999

[54] ELECTROCHEMICAL CELL COMPRISING A MOLTEN SALT ELECTROLYTE CONTAINING SODIUM IODIDE

[75] Inventors: Johan Coetzer, Pretoria; Isak L Vlok, Centurion, both of South Africa

[73] Assignee: Electro Chemical Holdings Societe Anonyme, Luxembourg

[21] Appl. No.: 08/807,450

[22] Filed: Feb. 28, 1997

[30] Foreign Application Priority Data

Feb. 29, 1996 [KR] Rep. of Korea .......................... 96/1643

[51] Int. Cl.⁶ .................................................. H01M 10/44
[52] U.S. Cl. ............................................ 429/102; 429/104
[58] Field of Search ................................ 429/101, 102, 429/104

[56] References Cited

U.S. PATENT DOCUMENTS

| | | | |
|---|---|---|---|
| 3,488,221 | 1/1970 | Shimotake et al. | 136/20 |
| 3,514,332 | 5/1970 | Minck | 136/6 |
| 3,716,409 | 2/1973 | Cairns et al. | 136/6 |
| 3,783,024 | 1/1974 | Gibson et al. | 136/6 |
| 3,841,914 | 10/1974 | Boyle et al. | 136/111 |
| 3,877,984 | 4/1975 | Werth | 136/6 F |
| 3,901,733 | 8/1975 | Toy et al. | 136/153 |
| 3,932,195 | 1/1976 | Evans et al. | 136/6 FS |
| 4,041,215 | 8/1977 | Kormanyos et al. | 429/104 |
| 4,049,885 | 9/1977 | Mitoff | 429/104 |
| 4,068,045 | 1/1978 | Abrams | 429/81 |
| 4,091,151 | 5/1978 | Minck | 429/104 |
| 4,206,272 | 6/1980 | Fischer et al. | 429/62 |
| 4,220,692 | 9/1980 | Hunt | 429/104 |
| 4,226,923 | 10/1980 | Mikkor | 429/104 |
| 4,230,778 | 10/1980 | von Benda et al. | 429/104 |
| 4,269,905 | 5/1981 | Wedlake | 429/8 |
| 4,279,974 | 7/1981 | Nishio | 429/104 |
| 4,310,607 | 1/1982 | Shay | 429/104 |
| 4,348,467 | 9/1982 | Wright | 429/94 |
| 4,366,215 | 12/1982 | Coetzer et al. | 429/199 |
| 4,405,696 | 9/1983 | Fischer et al. | 429/104 |
| 4,419,419 | 12/1983 | Knödler | 429/104 |
| 4,424,262 | 1/1984 | von Alpen et al. | 429/8 |
| 4,476,201 | 10/1984 | Repenning et al. | 429/62 |
| 4,492,742 | 1/1985 | Haberfellner et al. | 429/104 |
| 4,497,879 | 2/1985 | Lücke et al. | 429/62 |
| 4,529,676 | 7/1985 | Galloway et al. | 429/103 |
| 4,546,055 | 10/1985 | Coetzer et al. | 429/103 |
| 4,560,627 | 12/1985 | Bones et al. | 429/103 |
| 4,568,502 | 2/1986 | Theodore et al. | 264/63 |
| 4,588,662 | 5/1986 | McManis, III et al. | 429/52 |
| 4,592,969 | 6/1986 | Coetzer et al. | 429/50 |
| 4,626,483 | 12/1986 | Bones et al. | 429/50 |
| 4,722,875 | 2/1988 | Wright | 429/103 |
| 4,728,590 | 3/1988 | Redey | 429/221 |
| 4,732,741 | 3/1988 | Duncan et al. | 423/119 |
| 4,772,449 | 9/1988 | Bones et al. | 419/2 |
| 4,797,333 | 1/1989 | Coetzer et al. | 429/103 |
| 4,800,143 | 1/1989 | Harbach et al. | 429/153 |
| 4,846,943 | 7/1989 | Coetzer et al. | 204/61 |
| 4,894,299 | 1/1990 | Morse | 429/104 |
| 4,910,105 | 3/1990 | Tilley et al. | 429/103 |
| 4,925,749 | 5/1990 | Wright | 429/104 |
| 4,966,823 | 10/1990 | Bugga et al. | 429/104 |

(List continued on next page.)

*Primary Examiner*—Maria Nuzzolillo
*Assistant Examiner*—Monique M. Wills
*Attorney, Agent, or Firm*—Arnold White & Durkee

[57] ABSTRACT

The invention provides a high temperature rechargeable electrochemical power storage cell a method of operating such cell, a cathode for the cell and a method of making the cell. A solid electrolyte sodium ion conductor separates a cell housing into anode and cathode compartments respectively containing molten sodium anode material and a nickel-containing active anode material. The active cathode material is dispersed in a porous matrix which is electronically conductive and has a sodium aluminium halide molten salt electrolyte, containing sodium and chlorine ions, impregnated therein. The cathode compartment contains an additional metal selected from iron, cobalt, antimony and mixtures thereof. The molten salt electrolyte has, dissolved therein, sodium iodide, which forms 1–20% by mass of the sodium halide in the cathode compartment.

9 Claims, 8 Drawing Sheets

U.S. PATENT DOCUMENTS

| | | | |
|---|---|---|---|
| 4,973,534 | 11/1990 | Adendorff et al. | 429/103 |
| 4,975,343 | 12/1990 | Coetzer | 429/103 |
| 4,975,344 | 12/1990 | Wedlake et al. | 429/103 |
| 4,992,345 | 2/1991 | Meintjes et al. | 429/103 |
| 5,006,427 | 4/1991 | Böhm et al. | 429/101 |
| 5,019,466 | 5/1991 | Coetzer et al. | 429/103 |
| 5,019,470 | 5/1991 | Bugga et al. | 429/223 |
| 5,051,324 | 9/1991 | Bones et al. | 429/103 |
| 5,053,294 | 10/1991 | Sernka et al. | 429/104 |
| 5,059,497 | 10/1991 | Prince et al. | 429/193 |
| 5,061,580 | 10/1991 | Wedlake et al. | 429/103 |
| 5,143,802 | 9/1992 | Wright | 429/103 |
| 5,158,839 | 10/1992 | Wright | 429/103 |
| 5,187,029 | 2/1993 | Coetzer et al. | 492/102 |
| 5,196,279 | 3/1993 | Tarascon | 429/194 |
| 5,208,119 | 5/1993 | Duncan | 429/103 |
| 5,219,682 | 6/1993 | Bones et al. | 429/193 |
| 5,230,968 | 7/1993 | Bones et al. | 429/191 |
| 5,234,778 | 8/1993 | Wright | 429/103 |
| 5,279,908 | 1/1994 | Bones et al. | 492/102 |
| 5,283,135 | 2/1994 | Redey et al. | 429/103 |
| 5,316,877 | 5/1994 | Thackeray et al. | 429/197 |
| 5,340,668 | 8/1994 | Redey et al. | 429/103 |
| 5,403,676 | 4/1995 | Coetzer et al. | 429/50 |
| 5,441,829 | 8/1995 | Attwood et al. | 429/158 |
| 5,472,806 | 12/1995 | Meintjes | 429/165 |
| 5,476,732 | 12/1995 | Coetzer | 429/103 |
| 5,476,733 | 12/1995 | Coetzer et al. | 429/103 |
| 5,573,873 | 11/1996 | Bugga et al. | 429/223 |
| 5,604,053 | 2/1997 | Coetzer et al. | 429/103 | ered with sulphur or
ELECTROCHEMICAL CELL COMPRISING A MOLTEN SALT ELECTROLYTE CONTAINING SODIUM IODIDE This invention relates to high temperature rechargeable electrochemical power storage cells, and to a method of operating such a cell. More particularly, it relates to such cell having molten sodium as its active anode material and having nickel/nickel chloride as its active cathode material, to a method of operating such cell, to a cathode for the cell, and to a method of making the cell.

According to one aspect of the invention, in a high temperature rechargeable electrochemical power storage cell having a housing divided by a separator which is a solid electrolyte conductor of sodium ions into an anode compartment and a cathode compartment, the anode compartment containing sodium forming an active anode material for the cell and the cell having an operating temperature at which the sodium is molten, the cathode compartment containing a sodium aluminium halide molten salt electrolyte comprising sodium cations and chloride anions, and having an aluminium:sodium atomic ratio of at most 1:1, which molten salt electrolyte is also molten at the operating temperature of the cell, and the cathode compartment also containing an electronically conductive electrolyte-permeable porous matrix, impregnated by the molten salt electrolyte and having a nickel-containing active cathode material dispersed in its porous interior, in finely divided particle—and/or thin layer form, in contact with the molten salt electrolyte and in contact with the matrix, the sodium and molten salt electrolyte being in contact with, and being separated by, the separator, to couple the active cathode material electrochemically with the sodium, the cathode compartment also containing an additional metal selected from iron (Fe), cobalt (Co), antimony (Sb) and mixtures thereof, there is provided the improvement whereby the molten salt electrolyte has, dissolved therein, sodium iodide (NaI), the NaI forming 1–20% by mass of the sodium halide in the cathode compartment.

The molten salt electrolyte can be regarded as a mixture of, on the one hand, aluminium halide, and, on the other hand, sodium halide, with an aluminium:sodium atomic ratio of substantially 1:1 with the said atomic ratio being at most 1:1 and usually slightly less than 1:1. Typically, the major proportion of the halide anions in the molten salt electrolyte will be chloride anions, so that the molten salt electrolyte can be regarded as an essentially sodium aluminium chloride electrolyte, doped with other halide anions, namely with the iodide anions of the present invention, and optionally, as will emerge hereunder, also with bromide and/or fluoride anions.

Preferably the NaI forms 1–12% by mass of the sodium halide in the cathode compartment, more preferably 2–8%, and most preferably 2–6%.

As indicated above, the molten salt electrolyte is optionally doped with fluoride ions, eg as described in U.S. Pat. No. 4,592,969, or with bromide anions, eg as described in U.S. Pat. No. 5,403,676. Furthermore, the molten salt electrolyte or cathode as a whole may be doped with sulphur or a suitable sulphide, eg as described in U.S. Pat. No. 4,626,483. The solid electrolyte separator is preferably a sodium β-alumina ceramic solid electrolyte, more preferably a sodium β"-alumina ceramic solid electrolyte. Preferably the matrix is porous metallic nickel, being eg of the nature of sponge nickel. In a particular embodiment of the invention the molten salt electrolyte may thus be a sodium iodide-doped sodium aluminium chloride molten salt electrolyte, the separator being a sodium β"-alumina ceramic solid electrolyte, and the matrix being porous metallic nickel. To ensure that the aluminium:alkali metal atomic ratio in the molten salt electrolyte never exceeds 1:1 it is desirable for the cathode matrix to contain a sufficient amount of solid NaCl dispersed therein when the cell and cathode are fully charged, ie when all the electrochemically available Ni active cathode material has been halogenated (eg chlorinated) during charging.

When the cathode component contains Fe or Co as additional metal, the cell may be as described in more detail in the Applicant's co-pending U.S. patent application Ser. No. 08/807,453, filed Feb. 28, 1997 abandonded, and the additional metal:Ni mass ratio between the additional metal and the electrochemically active Ni may be 2:100–100:100, the active cathode material being Ni/NiCl$_2$ (together with Fe and/or Co, which may at least partially be chlorinated) and the cell in its fully charged state having an open circuit voltage corresponding to the Na—NiCl$_2$ couple at the cell operating temperature, eg 2.58V at 300° C. In other words, the active cathode material may be Ni/NiCl$_2$, being NiCl$_2$ in the fully charged state of the cell and being Ni in the fully discharged state of the cell, the additional metal being selected from Fe, Co and mixtures thereof, there being an additional metal:Ni mass ratio between the additional metal and the Ni in the NiCl$_2$ active cathode material in the fully charged state of the cell of 2:100–100:100, the cell in its fully charged state having an open circuit voltage corresponding to the Na—NiCl$_2$ couple at the operating temperature of the cell. Said additional metal:Ni mass ratio is preferably 2:100–25:100, more preferably 10:100–20:100.

When the additional metal is Sb the cell may be as described in more detail in U.S. Pat. No. 5,476,733, or the cell may instead be as described in more detail in Published British Patent Application No. GB 2 290 1 63A. In the former case, the atomic ratio between the electronically active Ni and the Sb may be 99:1–30:70, preferably 90:10–40:60 and more preferably 80:20–50:50; and in the latter case the Sb:Ni mass ratio between the Sb and the electrochemically active Ni may be 2:100–130:100, preferably 7:100–110:90 and more preferably 20:100–90:110. In each of these cases, the cell in its fully charged state may have an open circuit voltage (higher than that of the Na—NiCl$_2$ couple at the same temperature) corresponding to the couple, at the cell operating temperature, between the Na active anode material, and the active cathode material in its charged state, which active cathode material may be a halide, typically a chloride, of a compound of Ni and Sb, the open circuit voltage being eg 2.785V for NiSbCl$_x$ at 300° C., when x≦5. Thus, generally in this case, the active cathode material may comprise Ni and Sb, being chlorinated in the fully charged state of the cell and being metallic in the fully discharged state of the cell, the additional metal being Sb and the cell in its fully charged state having an open circuit voltage, corresponding to the couple, at the cell operating temperature, between the molten sodium anode material and the active cathode material, which open circuit voltage is higher than the Na—NiCl$_2$ couple at said operating temperature.

According to yet another aspect of the invention, in the operation of a high temperature rechargeable cell having a housing divided by a separator which is a solid electrolyte conductor of sodium ions into an anode compartment and a cathode compartment, the anode compartment containing sodium forming an active anode material for the cell and the cell having an operating temperature at which the sodium is molten, the cathode compartment containing a sodium aluminium halide molten salt electrolyte comprising sodium anions and chloride cations, and having an Al:sodium atomic ratio of at most 1:1, which molten salt electrolyte is also molten at the operating temperature of the cell, and the cathode compartment also containing an electronically conductive electrolyte-permeable porous matrix, impregnated by the molten salt electrolyte and having nickel-containing active cathode material dispersed in its porous interior, in finely divided particle—and/or thin layer form, in contact with the molten salt electrolyte and matrix, the sodium and molten salt electrolyte being in contact with and separated by the separator, to couple the active cathode material electrochemically with the sodium, the cathode compartment containing an additional metal selected from Fe, Co, Sb and mixtures thereof, there is provided a method of increasing the stability of the cell which comprises doping the molten salt electrolyte with NaI, the NaI dissolving in the molten salt electrolyte and forming 1–20% by mass of the sodium halide in the cathode compartment.

Preferably, the NaI dissolves in the molten salt electrolyte to form 1–12% by mass of the sodium halide in the cathode compartment, more preferably 2–8% and most preferably 2–6%.

With regard to increasing the stability of the cell it is to be noted that cells of the type in question but which omit the NaI, display, after >100 charge/discharge cycles, an increase in initial internal resistance, ie at the start of discharge, associated with the cathode, of up to 10%, coupled with a reduction in cell voltage of up to 10% and coupled with a reduction in cell capacity of up to 10%. The present invention acts to increase cell stability by reducing this increase in initial resistance, and by reducing the associated decreases in voltage and capacity.

According to another aspect of the invention there is provided a cathode for a high temperature rechargeable electrochemical cell as described above, the cathode comprising a porous electronically conductive matrix which is permeable to a sodium aluminium halide electrolyte in molten form, the matrix having a nickel-containing active cathode material dispersed in its porous interior in finely divided particle—and/or thin layer form, and the matrix being impregnated with a sodium aluminium halide molten salt electrolyte comprising sodium cations and chloride anions, and having an aluminium:sodium atomic ratio of at most 1:1, the cathode compartment also containing an additional metal selected from Fe, Co, Sb and mixtures thereof, and the molten salt electrolyte having, dissolved therein, NaI, the NaI forming 1–20% by mass of the sodium halide in the cathode compartment.

Preferably the NaI forms 1–12% by mass of the sodium halide in the cathode compartment, more preferably 2–8% and most preferably 2–6%.

In more detail, the cathode may be as described above with reference to the cell of the present invention, the cathode having an operating temperature at which the molten salt electrolyte is molten.

The invention extends also to a method of making a cell as described above which comprises the step of loading, into a cathode compartment separated in a cell housing from an anode compartment by a separator which is a solid electrolyte conductor of sodium ions, constituents of the cell cathode in their discharged or overdischarged state, the cathode constituents comprising iodide anions and the method including the step of activating or conditioning the cell, after it has been loaded, by charging the cell at the cell operating temperature by subjecting it to a charging potential to take it through a charge cycle up to its fully charged state, the NaI in the fully charged state of the cell forming 1–20% by mass of the sodium halide in the cathode compartment.

Methods of loading the cells of the type in question in their charged or overdischarged states are described in U.S. Pat. Nos. 4,529,676, 4,722,875, 4,797,333, 4,772,449 and British Patent 2 226 692, and it is contemplated that the cell will usually be loaded with a precursor of the cathode which is a mixture in particulate form, conveniently cold-pressed into granules having a size of 250–1000 µm.

During the charging it may be desirable, for certain embodiments of the invention, while employing a charging potential sufficient to chlorinate the electrochemically active nickel in the cathode at the cell operating temperature, to keep the charging potential sufficiently low to avoid chlorinating any dopant metal such as Fe or Co. In this regard it should be noted that by fully charged for such cells is meant the state of the cell or cathode in which all the available Ni in the porous interior of the matrix has been converted by the charging potential to $NiCl_2$. In other embodiments of the invention, eg when the dopant metal is Sb, the charging may be sufficient to chlorinate the dopant metal. It will also be appreciated that the cathodes of the present cell can be used in the cell in which it has been formed or activated, or, after activation in an activating- or conditioning cell, it may be removed therefrom for loading into, and use in, another cell.

The invention will now be described, by way of example, with reference to the following Examples and with reference to the accompanying diagrammatic drawings, in which.

Figure 1:
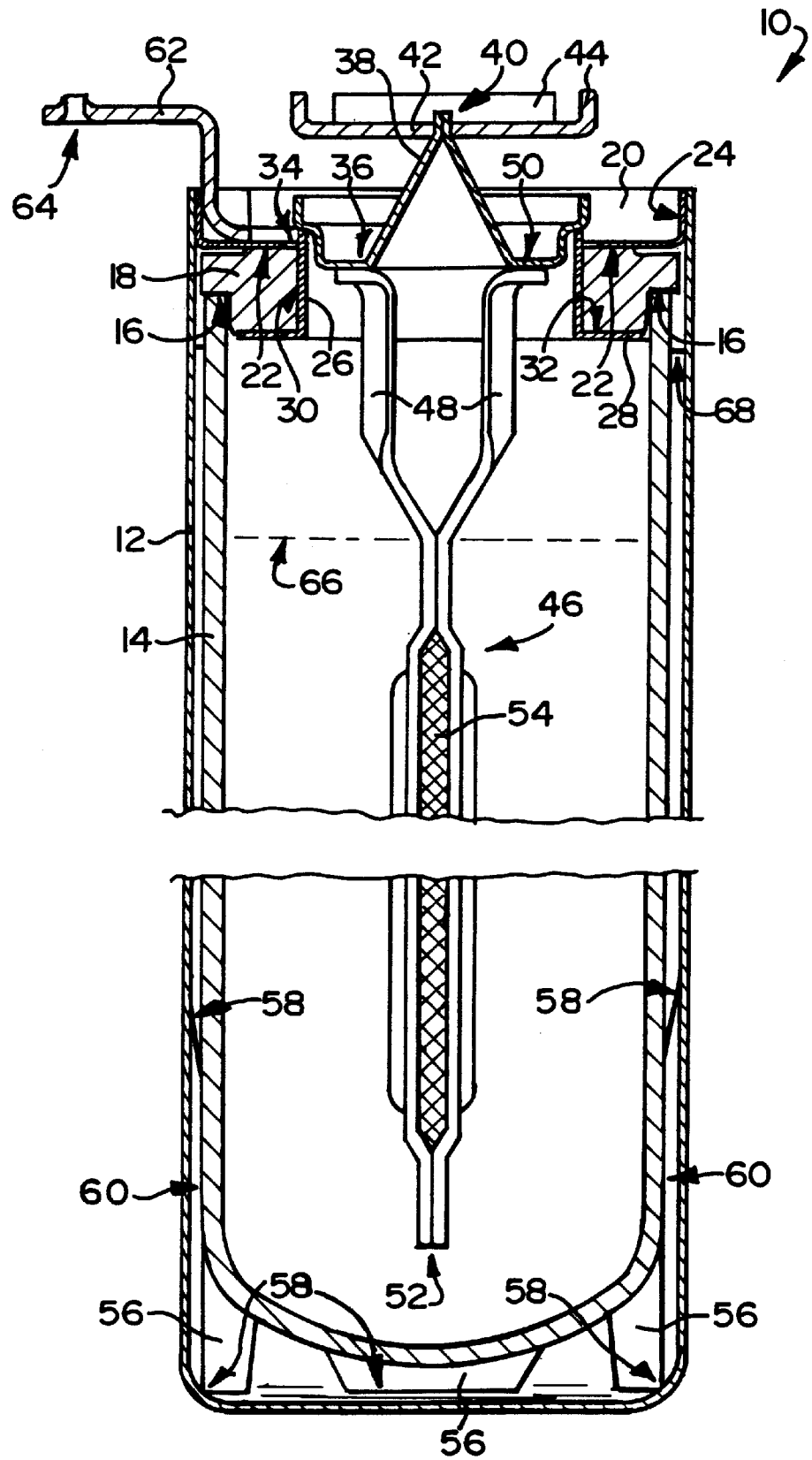
FIG. 1 shows a schematic sectional side elevation of a test cell according to the invention.

In FIG. 1 a test cell according to the invention is generally designated 10. The cell 10 has housing in the form of a casing 12 of square cross-section made of mild steel and containing, centrally suspended therein, a sodium β"-alumina separator tube 14. The tube 14 is glass-welded at 16 to an α-alumina insulating collar 18. A pressed nickel lid 20 for the casing 12 is sealingly thermocompression-bonded to the upper surface of the collar 18 at 22, the lid 20 having an upstanding rim 24 welded into the open end of the casing 12.

A nickel tube 26 having a radially projecting circumferentially extending flange 28 is sealingly thermocompression-bonded to the collar 18 in the radial direction at 30 and, via the flange 28, to the lower surface of the collar 18 at 32. The upper edge of the tube 26 stands upwardly proud of the upper surface of the collar 18 and is separated from the inner edge of the lid 20 by an insulating space at 34. A cup-shaped nickel pressing 36 is welded sealingly on to the upper edge of the tube 26. The pressing 36 has a central upstanding filler tube 38 whose upper end 40 (seen edge-on in the drawing) is crimped closed so that it is chisel-shaped, and this upper end 40 is welded into a slot in a square (in plan view) mild steel cathode terminal plate 42 having upstanding rims 44 at its edges.

A nickel cathode current collector 46 has two limbs 48 welded to the floor 50 of the pressing 36, whereby it is suspended to extend downwardly to a lower end at 52 spaced closely above the lower closed end of the separator tube 14. The current collector 46 is shaped to embrace an elongated carbon felt molten salt electrolyte wick 54 which extends vertically along the interior of the separator tube 14, the wick 54 being exposed along its length to the interior of the tube 14.

The lower end of the space between the casing 12 and the separator tube 14 is provided with four mild steel wicking shims 56, circumferentially spaced from each other and shaped to be in contact with the casing at 58 and with the tube at 60. The casing 12 is provided with a mild steel anode terminal 62, welded into the lid 20 and having a slot 64 for receiving a rim 44 of the cathode terminal plate 42 of an adjacent like cell 10.

A cathode (not shown but described hereunder) fills the tube 14 up to the level 66 and molten sodium anode material (also not shown) fills the space between the tube 14 and casing 12 up to the level 68.

To load a precursor of the cell a homogeneous powder mixture is formed from various constituents of the cathode such as nickel powder (2–10 $\mu$m, eg 2–5 $\mu$m in particle size), NaCl powder (53–250 $\mu$m, eg 53 $\mu$m in particle size) and aluminium powder (53–150 $\mu$m, eg 125 $\mu$m in particle size). The powder mixture is then granulated to form self-supporting granules of a granule size of 250 $\mu$m<granule size<1000 $\mu$m, and the granules are charged into the tube 14 via the filler tube 38, tamped until they are tap dense and fill the tube 14 to level 66. The cell is than heated to 290° C. and the tube 14 is charged via the tube 38 with 125–130 g molten NaAlCl$_4$, followed by crimping shut of the top of the tube 38 at 40 and welding thereto of the plate 42. Typically the assembly of the cell will involve connecting together the collar 18 with the tube 14, lid 20, terminal 62, tube 26, pressing 36 and cathode current collector 46, followed by loading as described above with the crimping of the tube end 40 and attachment of the plate 42 to the end 40 of the tube 38. Finally, the lid 20 can be welded into the casing 12 at 24, after the shims 56 have been inserted into the casing 12. The molten NaAlCl$_4$ electrolyte impregnates the powder mixture and is wicked upwardly by the felt 54; and the shims 56 provide electronic contact between the tube 14 and the casing 12 and act to wick molten sodium (upon charging as described hereunder) upwardly between the casing 12 and tube 14, while acting initially as anode current collectors. The crimping at 40 and the welding at 24 take place under vacuum. Any antimony metal powder used, will have a particle size of 5–53 $\mu$m, eg 44 $\mu$m, any FeS powder used will have a particle size of 53–150 $\mu$m, eg 125 $\mu$m, any Fe or Co powder used will have a particle size of 2–44 $\mu$m, eg 10 $\mu$m, and any NaF or NaBr powder used will have a particle size of 2–53 $\mu$m, eg 15 $\mu$m.

EXAMPLE 1

A cell precursor was loaded as described above, with cathode/molten salt electrolyte precursor mixture in its cathode compartment, and no sodium in its anode compartment, the precursor mixture having the following composition:

| Constituent | Mass (g) |
|---|---|
| Ni | 123.0 |
| Fe | 10.0 |
| NaCl | 105.0 |
| NaI | 6.0 |
| NaF | 4.0 |
| FeS | 4.0 |
| Al | 2.0 |
| TOTAL | 254 |

The cell precursor was heated to a cell operating temperature of 300° C. and was subjected to a charging potential of 2.58–2.78 V at a constant charging current of 2,5 A to cause the chemical and/or electrochemical reactions whereby:

$$4NaCl+Al \rightarrow NaAlCl_4+3Na; \quad \text{(Reaction 1)}$$

and

$$2NaCl+Ni \rightarrow NiCl_2+2Na \quad \text{(Reaction 2)}$$

The NiCl$_2$ formed charged active cathode material and the NaAlCl$_4$ formed molten salt electrolyte, the Na migrating in ionic form through the separator into the anode compartment to form active anode material. The charging potential was discontinued when all the available Ni had been consumed, at which stage the cathode compartment contained a matrix formed from the residual metallic Ni, a residual amount of NaCl being dispersed in the matrix in solid form to ensure that the Al:Na atomic ratio in the cathode did not exceed 1:1, the NaI in turn being dissolved in the NaAlCl$_4$ molten salt electrolyte, the NaF (fluoride dopant) also being dissolved in the molten salt electrolyte and the FeS (sulphide dopant) being dispersed in the NiCl$_2$. The NiCl$_2$ was dispersed in the matrix which was saturated with the NaAlCl$_4$, and the cell so obtained was in accordance with the present invention.

The above loading procedure and charging procedure were repeated in a control cell having a precursor mixture which was identical except that the NaI was omitted.

The cells of Example 1 were charged, during cell cycling, at a current of 10 A up to a voltage of 2.76 V, after which they were charged at a current of 1 A. Discharge was at 20 A until 30 Ah of capacity had been discharged. The cells had a theoretical capacity of 42 Ah but were operated at a capacity of 30 Ah, at 297° C. Results are shown in FIGS. 2–5.

EXAMPLE 2

Example 1 was repeated as regards loading and charging to form another cell according to the invention, using the following cathode/molten salt electrolyte precursor mixture in the cathode compartment:

| Constituent | Mass (g) |
|---|---|
| Ni | 117.1 |
| Sb | 28.6 |

-continued

| Constituent | Mass (g) |
| --- | --- |
| NaCl | 93.3 |
| NaI | 6.0 |
| NaF | 4.6 |
| FeS | 4.2 |
| Al | 2.0 |
| TOTAL | 255.8 |

Figure 6:
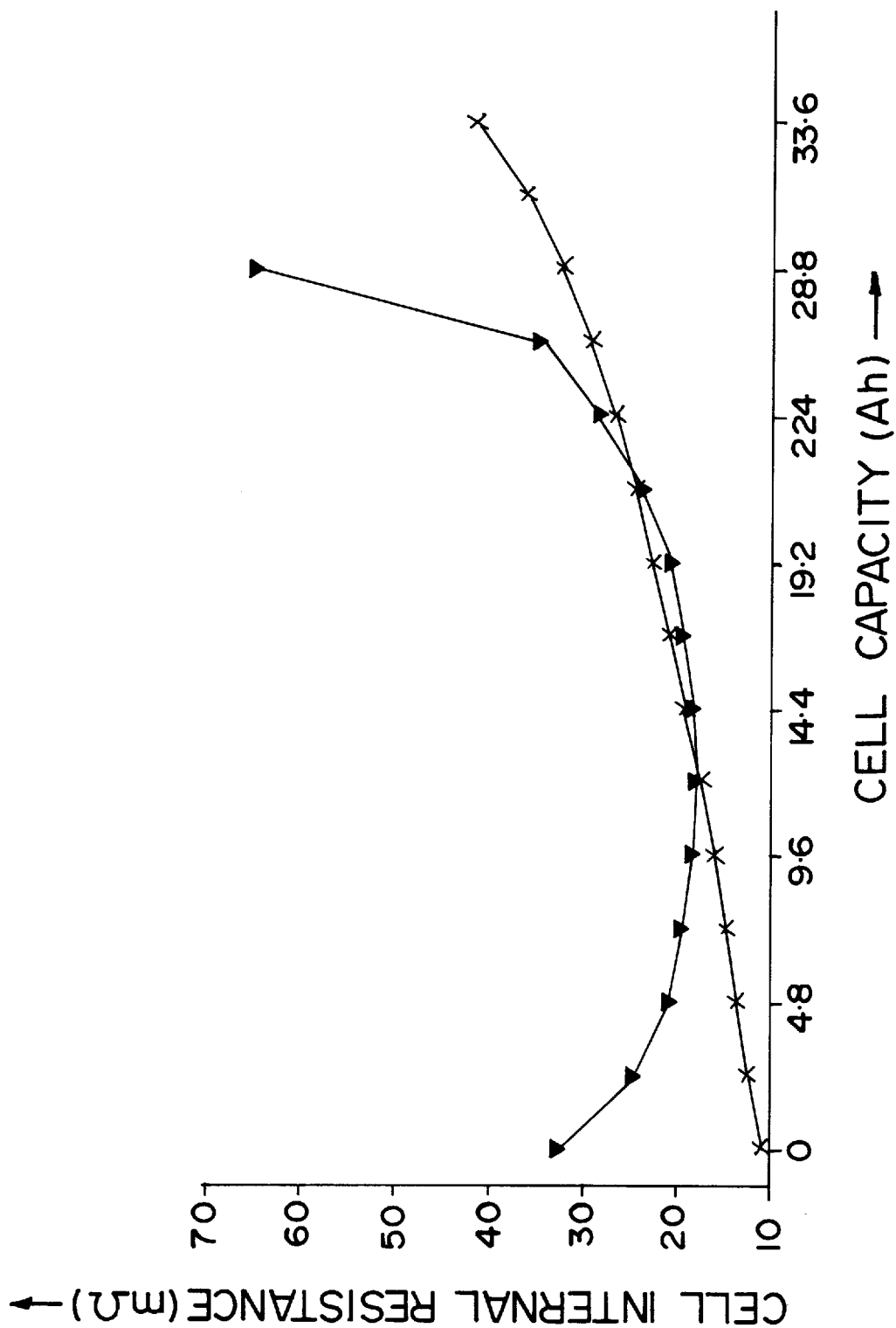
FIG. 6 shows a plot of resistance (mΩ) against capacity (Ah) for another cell according to the invention and another control during the 50th charge/discharge cycle.

The loading and charging procedures were then repeated in a control cell having a precursor mixture which was identical except that the NaI was omitted. The cells of Example 2 were also operated at 297° C., being charged at 2.5 A up to 2.72 V and discharged at 12 A down to 1.7 V. They had a theoretical capacity of 37 Ah. Results are shown in FIG. 6.

EXAMPLE 3

Example 1 was repeated as regards loading and charging to form a further cell according to the invention, using the following cathode/molten salt electrolyte precursor mixture in the cathode compartment:

| Constituent | Mass (g) |
| --- | --- |
| Ni | 45.8 |
| Sb | 95.6 |
| Mo | 4.5 |
| NaCl | 79.3 |
| NaF | 3.0 |
| NaI | 7.2 |
| NaBr | 12.6 |
| Al | 2.0 |
| Total | 250.0 |

The loading and charging procedures were then repeated in a control cell having a precursor mixture as follows:

| Constituent | Mass (g) |
| --- | --- |
| Ni | 49.0 |
| Sb | 101.7 |
| Mo | 4.3 |
| NaCl | 79.0 |
| NaF | 4.0 |
| NaBr | 10.0 |
| Al | 2.0 |
| Total | 250.0 |

Figure 7:
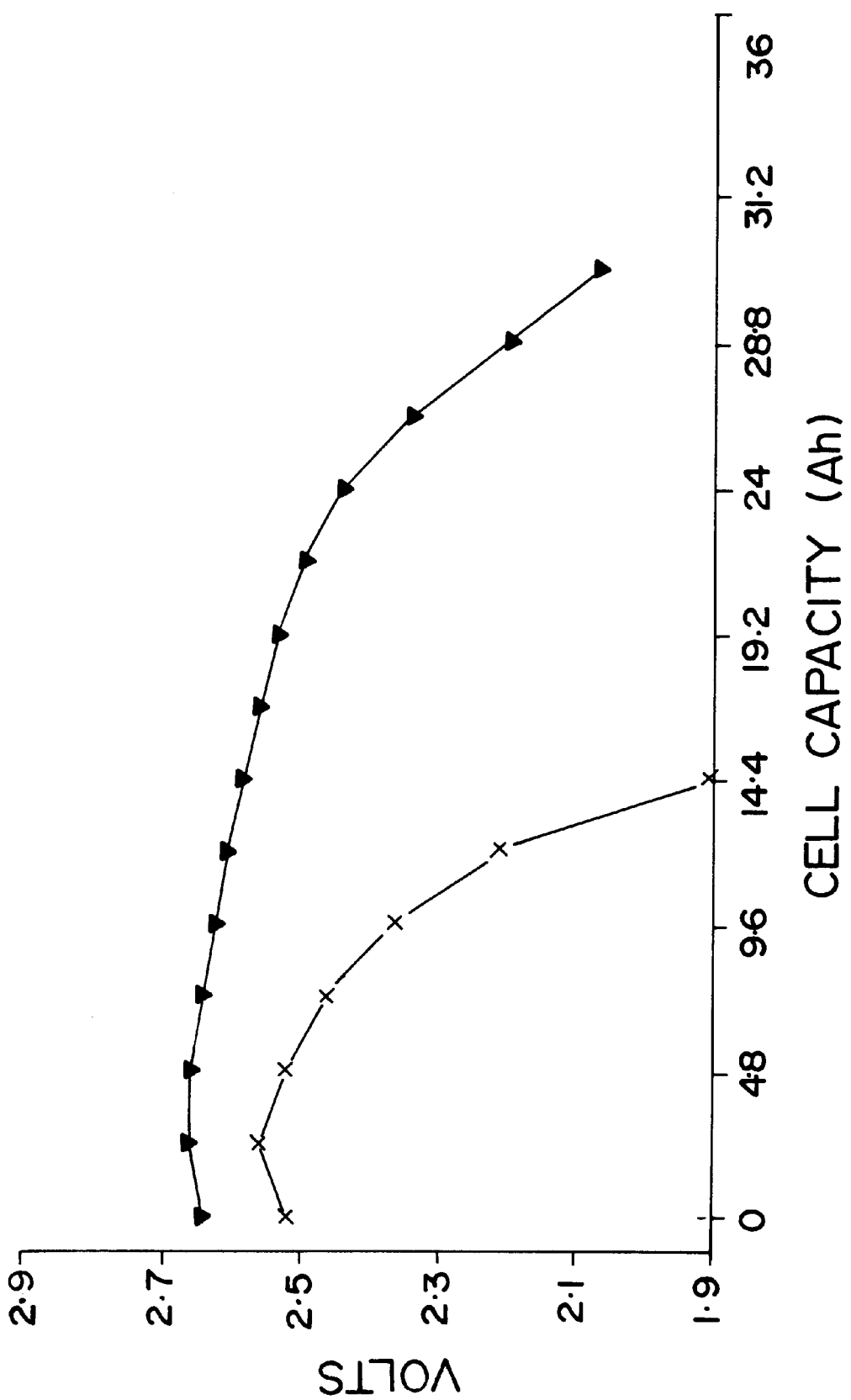
FIG. 7 shows a plot of cell voltage (V) against cell capacity (Ah) for a yet further cell according to the invention and a further control during the 50th charge/discharge cycle.
Figure 8:
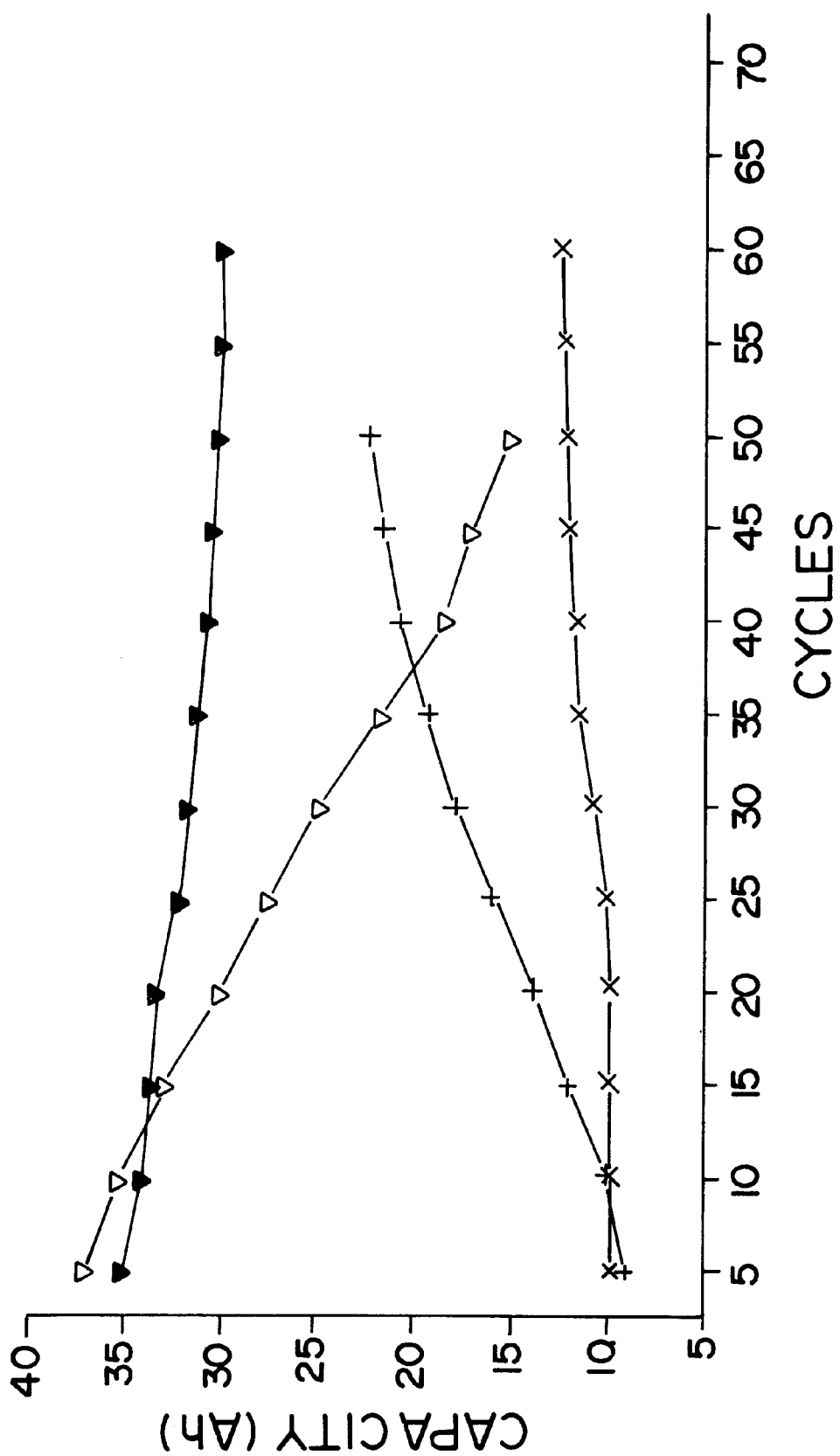
FIG. 8 shows, for the same cells whose plots are shown in FIG. 7, plots of resistance (mΩ) and capacity (Ah) against cell charge/discharge cycles.

The cells of Example 3 were also operated at 297° C., being charged at 2.5 A up to 2.90 V and discharged at 12 A down to 1.80V. They had a theoretical capacity of 37 Ah. Results are shown in FIGS. 7 and 8.

Figure 2:
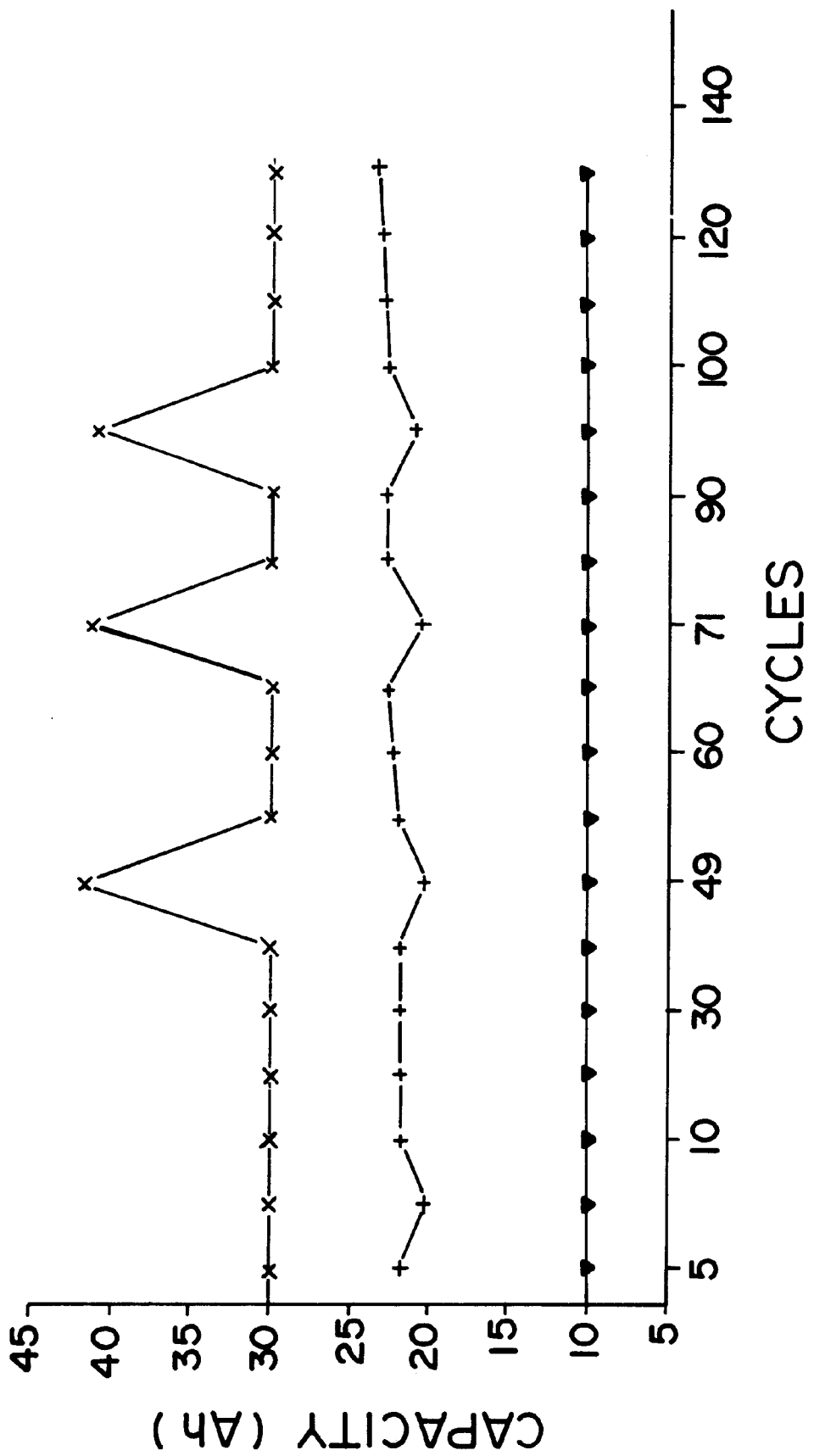
FIG. 2 shows a plot of capacity (Ah) and resistance (mΩ) against cell charge/discharge cycles for a cell according to the invention.

From FIG. 2 it is to be noted that the cell according to the invention of Example 1 was relatively stable with regard to capacity and resistance over the first 100 cycles, after the relatively rapid charge/discharge cycling employed. In FIG. 2 initial cell internal resistance, at the start of each discharge cycle, is plotted, as well as cell internal resistance after 24 Ah of discharge have taken place.

Figure 3:
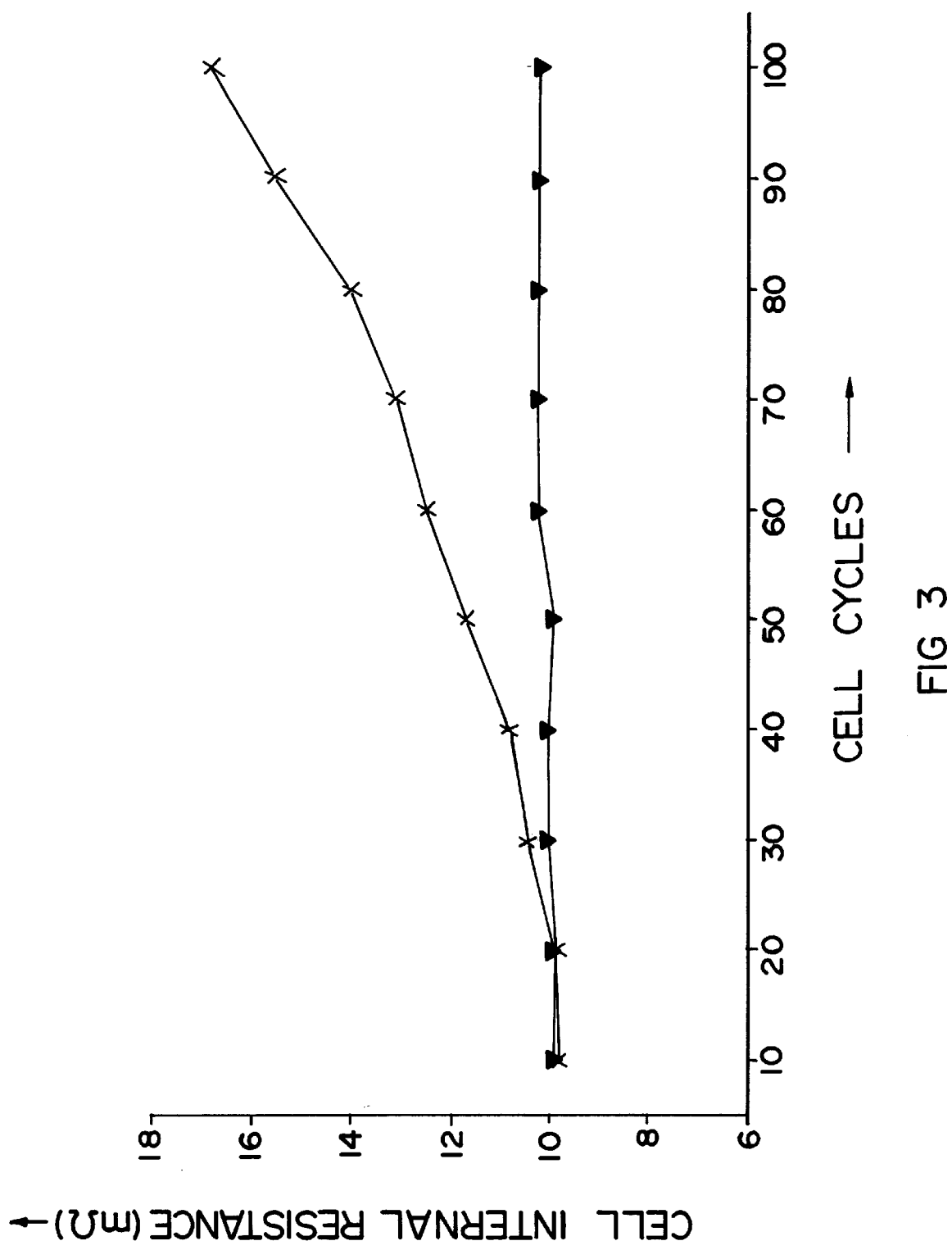
FIG. 3 shows a plot of initial resistance (mΩ) against charge/discharge cycles for the same cell whose plot is shown in FIG. 2 and for a control cell, at the start of each discharge cycle.

Reference to FIG. 3 shows that the Example 1 control cell internal resistance climbs much faster as the cell is cycled, than that of the cell according to the invention, whose internal resistance remains relatively constant.

Figure 4:
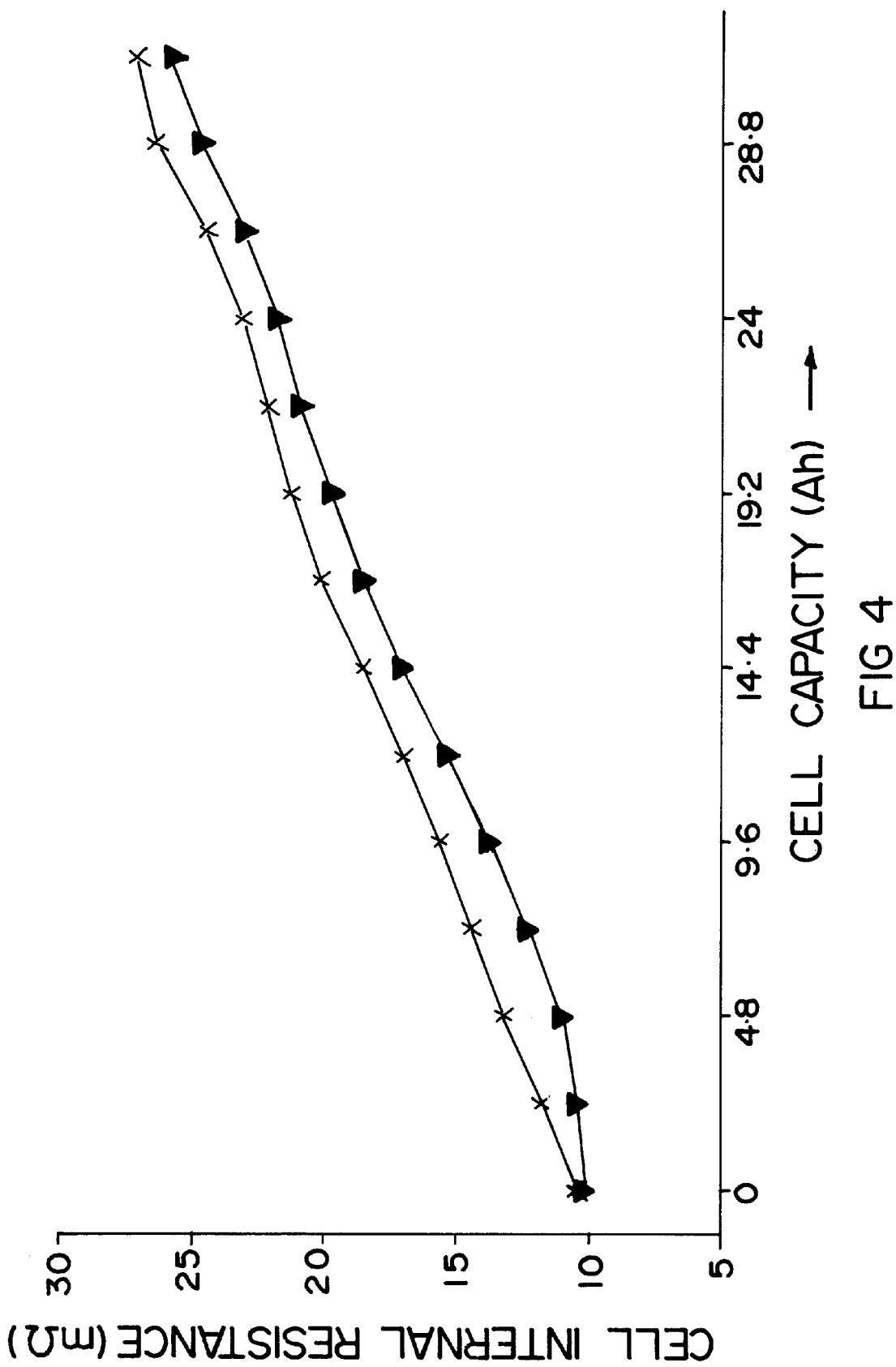
FIG. 4 shows a plot of resistance (mΩ) against capacity (Ah) for the same cells whose plots are shown in FIG. 3, after the 10th charge/discharge cycle.
Figure 5:
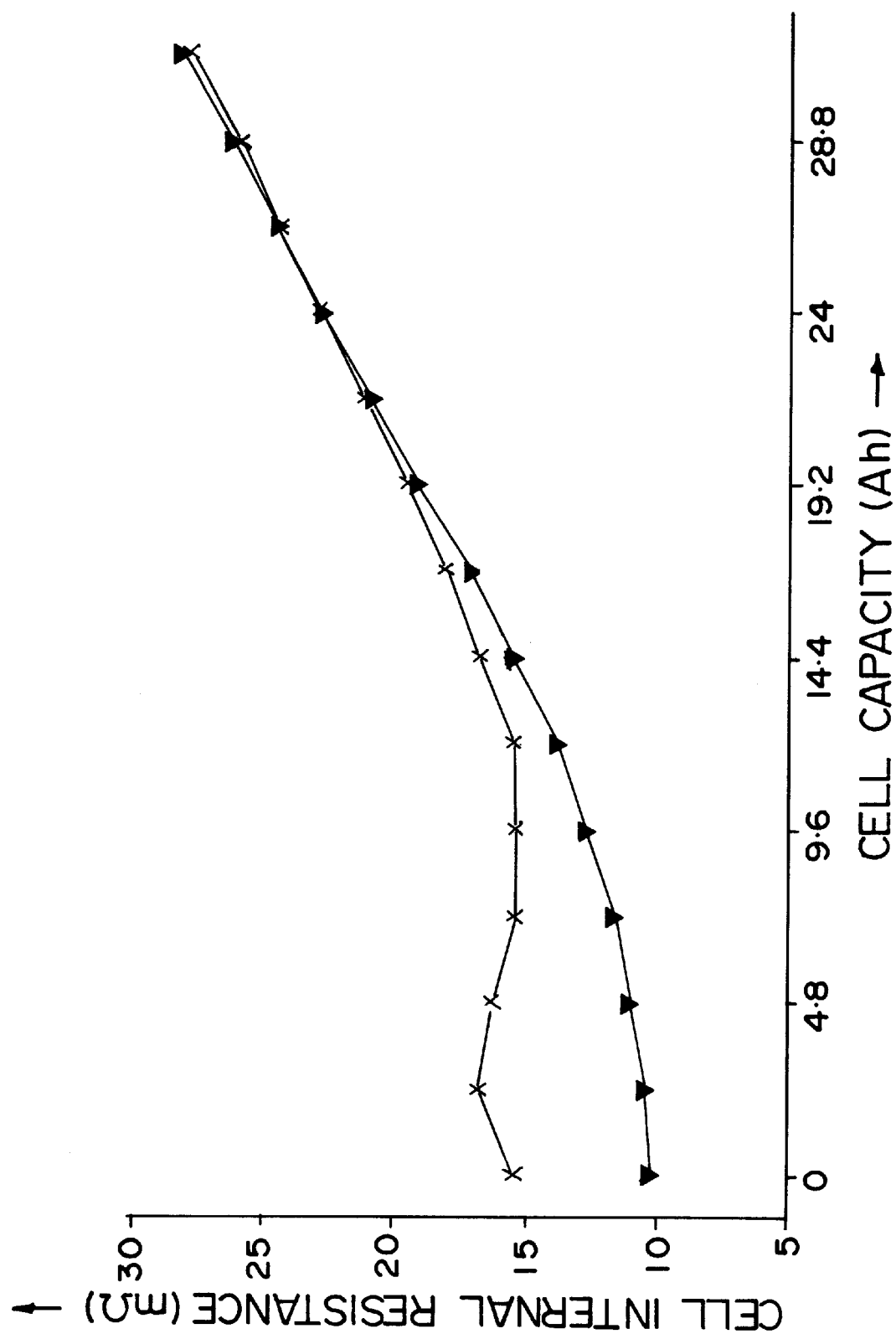
FIG. 5 shows a plot similar to FIG. 4, for the same cells, after the 100th charge/discharge cycle.

FIGS. 4 and 5 show that, both after 10 cycles and after 100 cycles, internal resistance for the cell of Example 1 according to the invention is lower than that of the Example 1 control cell, demonstrating enhanced stability with regard to cell internal resistance.

FIG. 6 in turn demonstrates that initial cell internal resistance for the cell of Example 2 in accordance with the invention is much more stable than that of the control of Example 2, the increase in initial cell internal resistance, ie at the start of a discharge cycle, leading to eventual capacity decay.

From FIGS. 7 and 8 it appears that initial cell capacity of the control of Example 3 became reduced by more than 50% after 50 charge/discharge cycles at the high cell cycling rates employed, but for the cell of Example 3 according to the invention there was a substantial alleviation of this problem. Furthermore, from FIG. 8 it appears that capacity loss in the cells of Example 3 may be related to a rise in initial cell internal resistance, ie internal resistance at the start of each discharge cycle.

Finally it should be noted that, when a slightly modified cell loading procedure is used, and molten salt electrolyte is added in the cell cathode compartment to a cathode precursor mixture, the NaI dopant can be added initially to either the molten salt electrolyte of the precursor mix.

We claim:

1. A high temperature rechargeable electrochemical power storage cell having a housing divided by a separator which is a solid electrolyte conductor of sodium ions into an anode compartment and a cathode compartment, the anode compartment containing sodium forming an active anode material for the cell and the cell having an operating temperature at which the sodium is molten, the cathode compartment containing a sodium aluminum halide molten salt electrolyte comprising sodium cations and chloride anions, and having an aluminum:sodium atomic ratio of at most 1:1, which molten salt electrolyte is also molten at the operating temperature of the cell, and the cathode compartment also containing an electronically conductive electrolyte-permeable porous matrix, impregnated by the molten salt electrolyte and having a nickel-containing active cathode material dispersed in its porous interior, in finely divided particle—and/or thin layer form, in contact with the molten salt electrolyte and in contact with the matrix, the sodium and molten salt electrolyte being in contact with, and being separated by, the separator, to couple the active cathode material electrochemically with the sodium, the cathode compartment also containing an additional metal selected from the group consisting of iron (Fe), cobalt (Co) and mixtures thereof, wherein the improvement comprises a molten salt electrolyte which has, dissolved therein, sodium iodide (NaI), the NaI forming 1–20% by mass of the sodium halide in the cathode compartment.

2. A cell as claimed in claim 1, in which the NaI forms 2–8% by mass of the sodium halide in the cathode compartment.

3. A cell as claimed in claim 2, in which the NaI forms 2–6% by mass of the sodium halide in the cathode compartment.

4. A cell as claimed in claim 1, in which the active cathode material is Ni/NiCl$_2$, being NiCl$_2$ in the fully charged state of the cell and being Ni in the fully discharged state of the cell, the additional metal being selected from Fe, Co and mixtures thereof, there being an additional metal:Ni mass ratio between the additional metal and the Ni in the NiCl$_2$ active cathode material in the fully charged state of the cell of 2:100–100:100, the cell in its fully charged state having an open circuit voltage corresponding to the Na—NiCl$_2$ couple at the operating temperature of the cell.

5. A cell as claimed in claim 4, in which said additional metal:Ni mass ratio is 2:100–25:100.

6. A cell as claimed in claim 5, in which the additional metal:Ni mass ratio is 10:100–20:100.

7. A method of operating a high temperature rechargeable cell having a housing divided by a separator which is a solid electrolyte conductor of sodium ions into an anode compartment and a cathode compartment, the anode compartment containing sodium forming an active anode material for the cell and the cell having an operating temperature at which the sodium is molten, the cathode compartment containing a sodium aluminum halide molten salt electrolyte comprising sodium anions and chloride cations, and having an aluminum:sodium atomic ratio of at most 1:1, which molten salt electrolyte is also molten at the operating temperature of the cell, and the cathode compartment also containing an electronically conductive electrolyte-permeable porous matrix, impregnated by the molten salt electrolyte and having nickel-containing active cathode material dispersed in its porous interior, in finely divided particle—and/or thin layer form, in contact with the molten salt electrolyte and matrix, the sodium and molten salt electrolyte being in contact with and separated by the separator, to couple the active cathode material electrochemically with the sodium, the cathode compartment containing an additional metal selected from the group consisting of Fe, Co and mixtures thereof, the method comprising increasing the stability of the cell by doping the molten salt electrolyte with NaI, the NaI dissolving in the molten salt electrolyte and forming 1–20% by mass of the sodium halide in the cathode compartment.

8. A cathode for a cell as claimed in claim 1, the cathode comprising a porous electronically conductive matrix which is permeable to a sodium aluminium halide electrolyte in molten form, the matrix having nickel-containing active cathode material dispersed in its porous interior in finely divided particle—and/or thin layer form, and the matrix being impregnated with a sodium aluminium halide molten salt electrolyte comprising sodium cations and chloride anions, and having an aluminium:sodium atomic ratio of at most 1:1, the cathode compartment also containing an additional metal selected from Fe, Co, and mixtures thereof, and the molten salt electrolyte having, dissolved therein, NaI, the NaI forming 1–20% by mass of the sodium halide in the cathode compartment.

9. A method of making a high temperature rechargeable electrochemical power storage cell having a housing divided by a separator which is a solid electrolyte conductor of sodium ions into an anode compartment and a cathode compartment, the anode compartment containing sodium forming an active anode material for the cell and the cell having an operating temperature at which the sodium is molten, the cathode compartment containing a sodium aluminum halide molten salt electrolyte comprising sodium cations and chloride anions, and having an aluminum:sodium atomic ratio of at most 1:1, which molten salt electrolyte is also molten at the operating temperature of the cell, and the cathode compartment also containing an electronically conductive electrolyte-permeable porous matrix, impregnated by the molten salt electrolyte and having a nickel-containing active cathode material dispersed in its porous interior, in finely divided particle—and/or thin layer form, in contact with the molten salt electrolyte and in contact with the matrix, the sodium and molten salt electrolyte being in contact with, and being separated by, the separator, to couple the active cathode material electrochemically with the sodium, the cathode compartment also containing an additional metal selected from the group consisting of iron (Fe), cobalt (Co) and mixtures thereof, wherein the improvement comprises a molten salt electrolyte which has, dissolved therein, sodium iodide (NaI), the NaI forming 1–20% by mass of the sodium halide in the cathode compartment, which comprises the step of loading, into a cathode compartment separated in a cell housing from an anode compartment by a separator which is a solid electrolyte conductor of sodium ions, constituents of the cell cathode in their discharged or overdischarged state, the cathode constituents comprising iodide anions and the method including the step of activating or conditioning the cell, after it has been loaded, by charging the cell at the cell operating temperature by subjecting it to a charging potential to take it through a charge cycle up to its fully charged state, the NaI in the fully charged state of the cell forming 1–20% by mass of the sodium halide in the cathode compartment.

\* \* \* \* \*

UNITED STATES PATENT AND TRADEMARK OFFICE
CERTIFICATE OF CORRECTION

PATENT NO. : 5,972,533
DATED : October 26, 1999
INVENTOR(S) : Johan Coetzer, Isak L. Vlok It is certified that error appears in the above-identified patent and that said Letters Patent is hereby corrected as shown below:

Title page, item [30], delete "[KR]" and insert --[ZA]-- therefor.

Title Page, item {30}, delete "Korea" and insert --South Africa-- therefor.

In claim 4, column 8, line 63, after 'from', insert --the group consisting of-- therefor.

Signed and Sealed this

Eleventh Day of July, 2000

Attest:

Q. TODD DICKINSON

*Attesting Officer*     *Director of Patents and Trademarks*